(12) United States Patent
Lysen

(10) Patent No.: US 9,395,175 B2
(45) Date of Patent: Jul. 19, 2016

(54) DEVICE FOR DETERMINING THE POSITION OF MECHANICAL ELEMENTS

(71) Applicant: Prüftechnik AG, Ismaning (DE)

(72) Inventor: Heinrich Lysen, Garching (DE)

(73) Assignee: Prüftechnik Dieter Busch AG, Ismaning (DE)

( * ) Notice: Subject to any disclaimer, the term of this patent is extended or adjusted under 35 U.S.C. 154(b) by 236 days.

(21) Appl. No.: 13/928,892

(22) Filed: Jun. 27, 2013

(65) Prior Publication Data

US 2014/0022543 A1    Jan. 23, 2014

(30) Foreign Application Priority Data

Jul. 23, 2012   (DE) .................. 10 2012 014 520

(51) Int. Cl.
  *G01J 3/42*    (2006.01)
  *G01B 11/14*   (2006.01)
  *G01B 11/27*   (2006.01)

(52) U.S. Cl.
  CPC .............. *G01B 11/14* (2013.01); *G01B 11/272* (2013.01)

(58) Field of Classification Search
  CPC ....................................................... G01B 11/14
  USPC ........................................................ 356/319
  See application file for complete search history.

(56) References Cited

U.S. PATENT DOCUMENTS

| 4,518,855 | A | 5/1985 | Malak |
| 4,698,491 | A | 10/1987 | Lysen |
| 5,026,998 | A | 6/1991 | Hölzl |
| 6,356,348 | B1 | 3/2002 | Lysen et al. |
| 6,411,375 | B1 * | 6/2002 | Hinkle et al. ............. 356/152.1 |
| 6,476,914 | B1 * | 11/2002 | Hoelzl et al. ................. 356/400 |
| 6,931,738 | B2 | 8/2005 | Bodgren et al. |
| 7,042,561 | B1 | 5/2006 | Andersson |
| 8,037,615 | B2 | 10/2011 | Glaser |
| 2006/0215090 | A1 * | 9/2006 | Jee ............................... 349/114 |
| 2011/0126631 | A1 | 6/2011 | Bach |
| 2012/0140231 | A1 * | 6/2012 | Knox et al. .................. 356/442 |

FOREIGN PATENT DOCUMENTS

| DE | 101 22 321 | A1 | 4/2002 |
| DE | 101 17 390 | A1 | 10/2002 |
| DE | 10 2006 023 926 | A1 | 11/2007 |
| DE | 10 2008 048 574 | A1 | 3/2010 |
| EP | 0 962 746 | A2 | 12/1999 |
| EP | 1 037 013 | A2 | 9/2000 |
| WO | 00/28275 | A1 | 5/2000 |
| WO | 03/067187 | A1 | 8/2003 |

* cited by examiner

*Primary Examiner* — Tarifur Chowdhury
*Assistant Examiner* — Omar Nixon
(74) *Attorney, Agent, or Firm* — David S. Safran

(57) ABSTRACT

A device for determining the position of a first mechanical element relative to a second mechanical element, having a first measurement unit for attachment to the first mechanical element, a second measurement unit for attachment to the second mechanical element, and an evaluation unit. The first measurement unit emits spectrally differing first and second light beams in essentially the same direction and a position-sensitive optical detector. The second measurement unit has a reflector arrangement facing the first measurement unit, in order to reflect the first and second light beams onto the detector. Surfaces facing the first measurement unit being color splitters having different reflectivity/transmissibility for the first light beam and the second light beam. The evaluation unit determines the location of the first and second mechanical elements relative to one another from the incidence positions of the reflected first and second light beams on the detector.

24 Claims, 6 Drawing Sheets

DEVICE FOR DETERMINING THE POSITION OF MECHANICAL ELEMENTS

BACKGROUND OF THE INVENTION

1. Field of the Invention

The invention relates to a device for determining the position of a first and a second mechanical element relative relative to one another, with a first measurement unit for attachment to the first mechanical element and a second measurement unit for attachment to the second mechanical element, as well as an evaluation unit.

2. Description of Related Art

Such a device can be made, for example, for determining the alignment of two shafts relative relative to one another.

Typically, in these alignment measurement devices, at least one of the two measurement units has a light source for producing a light beam whose incidence point on one or more detectors on the other measurement unit or on a detector on the measurement unit provided with the light source is determined, in the latter case the other measurement unit reflecting back the light beam. Typically, to determine the alignment of the shafts relative relative to one another, the location of the incidence points of the light beam is determined in several rotational angle positions, for which the measurement units are pushed along the peripheral surface or the shafts with the measurement units are turned.

German Patent Application DE 33 20 163 A1 corresponding to U.S. Pat. No. 4,698,491 and German Patent Application DE 39 11 307 A1 corresponding to U.S. Pat. No. 5,026,998 describe shaft alignment measurement devices in which the first measurement unit emits a light beam which is reflected back from a mirror prism of the second measurement unit onto an optical detector of the first measurement unit.

German Patent Application DE 33 35 336 A1 corresponding to U.S. Pat. No. 4,518,855 describes a shaft alignment measurement device in which both the first and also the second measurement unit each emit a light beam and have an optical detector, the light beam being directed at the detector of the other measurement unit, respectively.

German Patent Application DE 8 14 466 A1, which corresponds to U.S. Pat. No. 6,356,348 B1, discloses a shaft alignment measurement device in which the first measurement unit emits a light beam which is incident on two optical detectors of the second measurement unit which are located in succession in the axial direction.

International Patent Application Publication WO 03/067187 A1, which corresponds to U.S. Pat. No. 6,931,738, discloses a shaft alignment measurement device in which the first measurement unit emits a fan-shaped beam which is incident on two optical detectors of the second measurement unit which are located in succession in the axial direction.

International Patent Application Publication WO 00/28275 A1, which corresponds to U.S. Pat. No. 7,042,561, discloses a shaft alignment measurement device in which two measurement units are each attached to a face of the two shafts, the first measurement unit emitting a fan-shaped light beam which strikes three marking pins which are located in one plane of the second measurement device.

European Patent Application EP 0 962 746 A2 and U.S. Pat. No. 6,476,914 disclose a shaft alignment measurement device in which the first unit has a source for a light beam in a first color, a beam splitter and a color-sensitive CCD detector and the second unit has a source for a light beam in a second color and a color splitter (color-selective beam splitter) which is reflective for the first color and is transmitting for the second color, the light source of the second unit viewed from the first unit being located behind the color splitter and the light source of the first unit viewed from the second unit being located behind the beam splitter. The light beam which has been emitted from the first unit first penetrates the beam splitter of the first unit and is then reflected on the color splitter of the second unit, this reflected beam in turn being reflected on the beam splitter of the first unit in order to reach the detector. The light beam from the second unit first penetrates the color divider of the second unit and is reflected from the beam splitter of the first unit onto the detector, European Patent Application EP 2 093 537 A1 corresponds to U.S. Pat. No. 8,037,615 B2 discloses a shaft alignment measurement device in which the first measurement unit emits a fan-shaped beam which is incident on two optical strip detectors of the second measurement unit which are located laterally parallel relative to one another at a distance, the longitudinal direction of the detectors being located perpendicular to the fan plane of the light beam.

In all of the shaft alignment measurement devices evaluated here, the incidence point of a light beam on a detector surface is determined and evaluated.

SUMMARY OF THE INVENTION

A primary object of this invention is to devise a device for determining the position of a first and a second mechanical element relative relative to one another which enables high precision and low error sensitivity of position determination.

This object is achieved in accordance with the invention by a device as described here.

In the design in accordance with the invention, the generation of two light beams which are emitted essentially in the same direction (with alternating divergence of typically roughly 10 mrad and a maximum 100 mrad), but which are spectrally different, is combined with a color-selective reflector arrangement which reflects the first light beam on one surface facing the first measurement unit with the light source and reflects the second light beam on at least one back surface in order to determine the location of the two measurement units, and thus, the location of the two mechanical elements relative to one another from the incidence position of the first and second light beams on the detector which is located like the light source in the first measurement unit.

The development of the measurement method which was described, for example, in German Patent Application DE 39 11 307 A1 and corresponding to U.S. Pat. No. 5,026,998 by means of light beams of different spectral composition, which development has been implemented therewith, can improve the accuracy and error sensitivity of the method since a second light beam is available during measurement which can be differentiated from the first light beam and which is reflected on the reflector arrangement differently from the first light beam.

When the device in accordance with the invention is used for the alignment of two shafts relative to one another, the adulteration of the measurement result by clutch play between the two shafts is reduced: During alignment, the connecting screws between the shafts must be loosened so that the movement of the two shafts in the same angular region is no longer ensured when the two shafts are turned into different measurement positions; accordingly then, the fixed assignment of the two measurement units which are connected to the shafts is no longer given, so that a displacement of the light spot on the detector can occur as a measurement error. Since the invention uses two differently reflected light beams which are influenced differently by the clutch play and are both incident on the detector, a displacement of the light spot caused by the clutch play on the detector can be recognized and compensated.

Since by using two spectrally different light beams, the reflection of the first light beam can be separated from the reflection of the second light beam, neither a penetration of the parallel offset of the shafts into the angular offset of the shafts nor a penetration of the angular offset of the shafts into the parallel offset of the shafts occurs. Also, a rotation of the reflector arrangement around the beam axis does not cause any error in the first approximation, i.e., for small angles.

Furthermore, the use of two light beams which can be distinguished from each other also enables an improved measurement of the distance between the two measurement units, and not only the divergence of the individual light beams, but also especially the generally slightly different emission angles of the two light beams relative to one another, i.e., their divergence relative to one another, can be used. A third degree of freedom can therefore be measured by the use of two distinguishable light beams.

In an especially advantageous configuration of the invention, the first and the second light beams are each produced fan-shaped, the detector being made line-shaped (as an analog strip detector or as a digital line detector), the incidence line of the fan profile of the first and second light beam on the detector being advantageously essentially perpendicular to the longitudinal direction of the detector. By using a line-shaped detector, the measurement range can be enlarged at the same cost, since an enlargement of the detector for a line-shaped detector takes place only in one direction and accordingly scales only linearly instead of quadratically, as in a surface detector with the detector costs. Furthermore, the fan-shaped configuration of the light beams can simplify the adjustment of the two measurement units relative to one another, since an exact calibration in directions within or parallel to the fan plane can be omitted. In particular, it is sufficient here if the reflector arrangement is adjustable only in one plane with respect to the first measurement unit, i.e., with respect to the light source and the detector (in particular, rotation of the reflector arrangement around an axis perpendicular to the plane of the fan is not necessary).

Preferably, the reflector arrangement is made as a Porro prism or as a roof edge prism, there being two back reflection surfaces which are located at a right angle relative to one another for the transmitted second light beam; when fan-shaped light beams are used the plane of the fan is oriented essentially parallel to the roof edge of the prism. Alternatively, the reflector arrangement can be made as a triple prism, then three back reflection surfaces for the transmitted second light beam being present.

Preferably, the two light beams are produced by means of a dual wave laser diode; but alternatively, also two laser diodes can be used which are located in parallel next relative to one another.

Preferably, the device is made for determining the alignment of shafts relative to one another, the first measurement unit being made for attachment to one peripheral surface of the first shaft and the second measurement unit being made for attachment to one peripheral surface of the second shaft.

Other preferred configurations of the invention will become apparent from the following detailed description of preferred embodiments, presented as examples, together with the accompanying drawings.

DETAILED DESCRIPTION OF THE INVENTION

Figure 1:
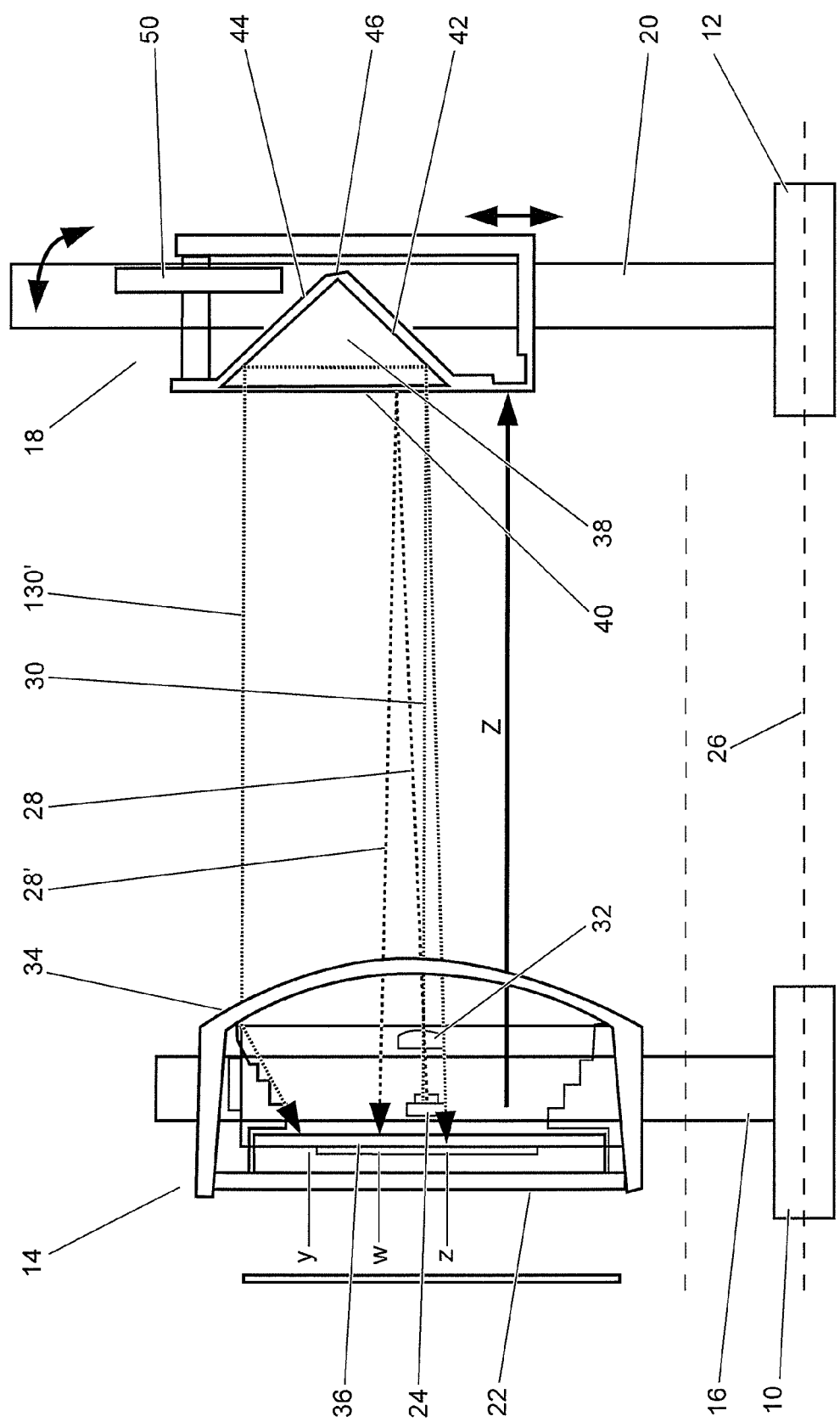
FIG. 1 is a side view of a first example of a position determination device in accordance with the invention.
Figure 2:
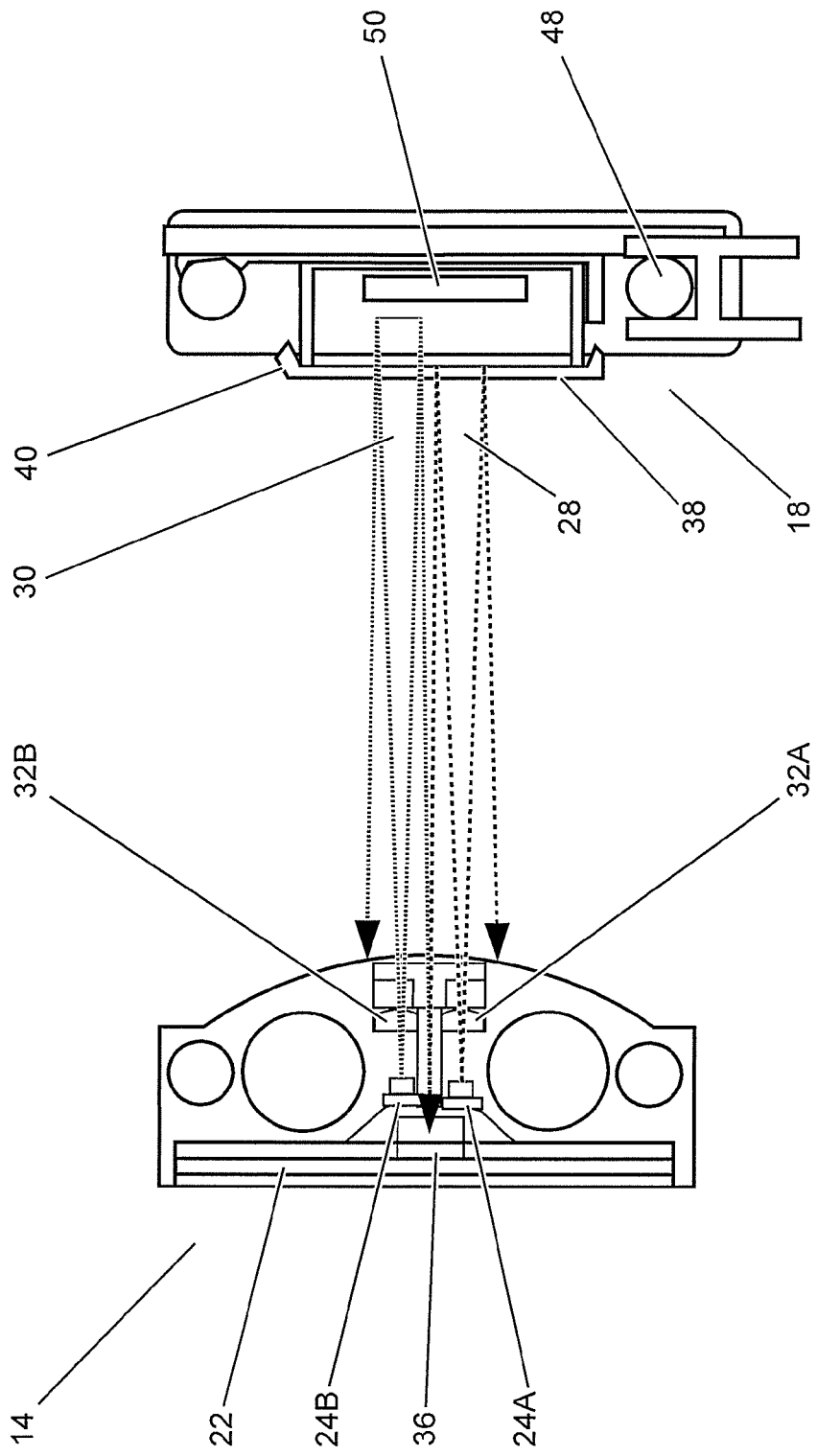
FIG. 2 is a plan view of the device from FIG. 1.
Figure 3:
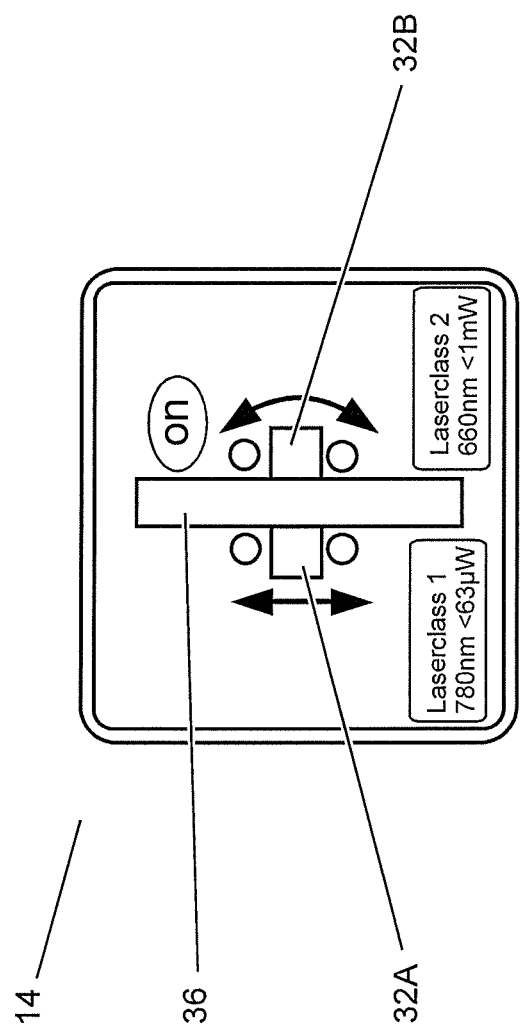
FIG. 3 is a front view of the surface of the left measurement apparatus facing the right measurement unit, viewed from the measurement apparatus located at right in FIGS. 1 and 2.

FIGS. 1 to 3 show a first example of a device in accordance with the invention for determining the alignment of a first shaft 10 of a machine (not shown) and a second shaft 12 of a machine (not shown) relative to one another. The device encompasses a first measurement unit 14 with an element 16 for attachment to a peripheral surface of the first shaft 10 and a second measurement unit 18 with an element 20 for attachment to the peripheral surface of the second shaft 12. Furthermore, the device includes an evaluation unit 22 which, in the illustrated example, forms a part of the first measurement unit 14, but could also be implemented as a part of an external device. The two shafts 10, 12 are located in succession as flush as possible with respect to a reference axis 26, the device with the two measurement units 14, 18 being used to determine a possible angular offset and/or parallel offset with respect to the reference axis 26 or relative to one another. The device typically also comprises means for displaying the result with respect to the angular offset or parallel offset (not shown in the figures).

The first measurement unit 14 comprises a light source 24 for producing a first light beam 28 and a second light beam 30, a collimator 32 for collimation of the first and second light beam 28, 30, imaging optics 34 and a position-sensitive optical detector 36. The two light beams 28, 30 differ spectrally; for example, one of the two beams can be in the red region, for example, at roughly 660 nm, while the other can be in the infrared region (for example, at roughly 780 nm). For example, suitable laser diodes are available for producing light in these regions. The light source can be, for example, a dual wave laser diode for producing the two light beams 28, 30 or alternatively two different laser diodes can be used, i.e., a separate laser diode for each of two light beams, as is indicated, for example, in FIG. 2 at 24A and 24B; in this case two separate collimators 32A and 32B are also used. Suitable laser diodes are available, for example, from the company Rohm, Japan.

The two light beams 28, 30 are emitted essentially in the same direction, but in practice have a certain minor mutual divergence, for example, 11 mm/m.

The collimator 32, 32A, 32B can have, for example, a focal distance of 10 mm. In the example in FIGS. 1 to 3, the collimator 32, 32A, 32B is made as a fan collimator in order to fan the two different light beams which have been produced by the light source 24, 24A, 24B, as is indicated in FIG. 2.

The detector 36 in the example shown in FIGS. 1 to 3 is made as a line-shaped detector, the incidence line of the fan profile of the first and second light beam 28, 30 on the detector 36 being essentially perpendicular to the longitudinal direction of the detector 36. The detector 36 can be made as an analog strip detector, for example, a one-dimensional silicon PSD (position sensitive detector), or it can be made as a digital line detector. In the latter case, the detector 36 is arranged such that the plane of the fan of the light beams 28, 30 which is incident on the detector 36 is essentially perpendicular to the line direction.

According to one embodiment, the detector 36 can be made color-sensitive in order to differentiate the points of incidence of the first and second light beam 28, 30 on the detector 36. According to an alternative preferred embodiment, the detector 36 and the light source 24, 24A, 24B are made such that the incidence of the first and second light beam 28, 30 on the detector 36 can be distinguished by different time control of the intensity of the first and second light beam 28, 30, i.e., the first and second light beams 28, 30 are produced at different times, and in this way can be differentiated by setting the corresponding time window during detection.

The second measurement unit 18 has a reflector arrangement 38 which has a front surface 40 facing the first measurement unit 14 and a first back surface 42 as well as a second back surface 44, the back surfaces 42, 44 being arranged relative to one another at an angle, typically a right angle, and forming a peak edge 46 between themselves (in the illustrated examples, the reflector arrangement is made as a so-called Porro prism or as a roof edge prism, the two parallel side surfaces of the prism being formed by congruent right triangles which are connected by boundary surfaces which are perpendicular to the triangle surfaces. The roof edge or peak 46 is essentially parallel to the plane of the fan of the light beams 28, 30 and is located perpendicular to the longitudinal direction of the line-shaped detector 36.

The front surface 40 is made as a color splitter and for one of the two light beams, for example, for the first light beam 28, is made more strongly reflective than for the other light beam (in this case, the second light beam 30), and accordingly, for the second light beam 30 is made more strongly transmitting than for the first light beam 28. The light beam which has been transmitted by the front surface 40, i.e., in the example, the second light beam 30, is reflected from one back surface (in the example, from the first back surface 42) to the other back surface (in the example, to the second back surface 44) and reflected from there through the front surface 40 in the direction of the first measurement unit 14 (the reflected part of the second beam 30 is labeled 30' in FIGS. 1 and 2).

The front surface 40 can be made, for example, as a cold light mirror, i.e., it transmits longer wavelengths.

The first light beam 28 is already reflected on the front surface 40 in the direction of the first measurement unit 14 (the reflected part is labeled 28' in FIGS. 1 and 2). The reflected beams 28', 30' are imaged onto the detector 36 by means of the imaging optics 34.

The imaging optics 34 can be, for example, a spherical lens. The imaging optics 34 are optional and enable an enlargement of the measurement range since by guiding a part of the beams which would otherwise go past the detector onto the detector 36 (this is indicated using the marginal ray illustrated by the broken line in FIG. 1).

The first measurement unit 14 is made such that the two light beams 28, 30 are steered directly, without interposition of a reflecting element, onto the reflector arrangement 38 of the second measurement unit 18, i.e., there are no reflecting elements between the light source 24 or light sources 24A, 24B and the reflector arrangement 38.

The planes of the fan-shaped spread of the first and second light beam 28, 30 are oriented essentially tangentially with respect to the peripheral surfaces of the shafts 10, 12. Likewise, the roof edge or peak 46 of the reflector arrangement 38 is oriented essentially tangentially with respect to the peripheral surfaces of the shafts 10, 12. Furthermore, the longitudinal direction of the detector 36 is oriented essentially radially with respect to the peripheral surfaces of the shafts 10, 12.

For purposes of calibrating the two measurement units 14, 18 relative to one another, the second measurement unit 18 is provided with a height adjustment 48 and an angle adjustment 50, the height adjustment 48 being used to adjust the position of the second measurement unit 18 in the radial direction with respect to the shaft 12 and the angle adjustment 50 being used to tilt the second measurement unit 18 with respect to the radial direction of the shaft 12 (these two adjustment possibilities are indicated at the right in FIG. 1 by double arrows). Adjustment of the second measurement 18 in the radial direction is not necessary due to the fan-shaped execution of the light beams 28, 30 since, in this direction, the detector 36 is hit anyway and there is no resolution in this direction.

In the example shown in FIG. 1, the two laser diodes 24A, 24B are arranged laterally at a distance from one another, so that the light which has been reflected by the reflector arrangement 38 can optionally travel through between the two laser diodes 24A, 24B onto the detector 36.

After completed calibration of the first measurement unit 14 and of the second measurement unit 18 relative to one another, the incidence position of the reflected first beam 28' and of the reflected second beam 30', in principle, indicates the misalignment of the two shafts 10, 12 relative to one another when the two shafts 10, 12 are turned around the axis 26 jointly with the measurement units 14, 18 located on them. Then, the characteristic of the incidence point is followed depending on the angle of rotation and is evaluated in the conventional manner in order to determine the vertical offset, the horizontal offset and the angular offset of the shafts 10, 12 (this method is described for an individual beam, for example, in German Patent Application DE 39 11 307 A1 and corresponding to U.S. Pat. No. 5,026,998).

After determining the misalignment, in a certain angular position, the shafts 10, 12 are calibrated, during shaft calibration, a measurement is taken to ascertain when the misalignment is best corrected.

In the conventional method, as is described for example, in German Patent Application DE 39 11 307 A1 and corresponding to U.S. Pat. No. 5,026,998, the measurement is taken in the "13:30 h position", but only either the horizontal or the vertical direction should be calibrated since otherwise the result indicated by the measurement apparatus is not correct.

In the device as shown in FIGS. 1 to 3, conversely, the radial direction is always correctly indicated, regardless of which direction the shafts are calibrated relative to one another; in any case, for the tangential direction there is no display, i.e., the other direction must be calibrated in another position of the measurement apparatus 14, 18 (i.e., in another angular position of the shafts).

Figure 6:
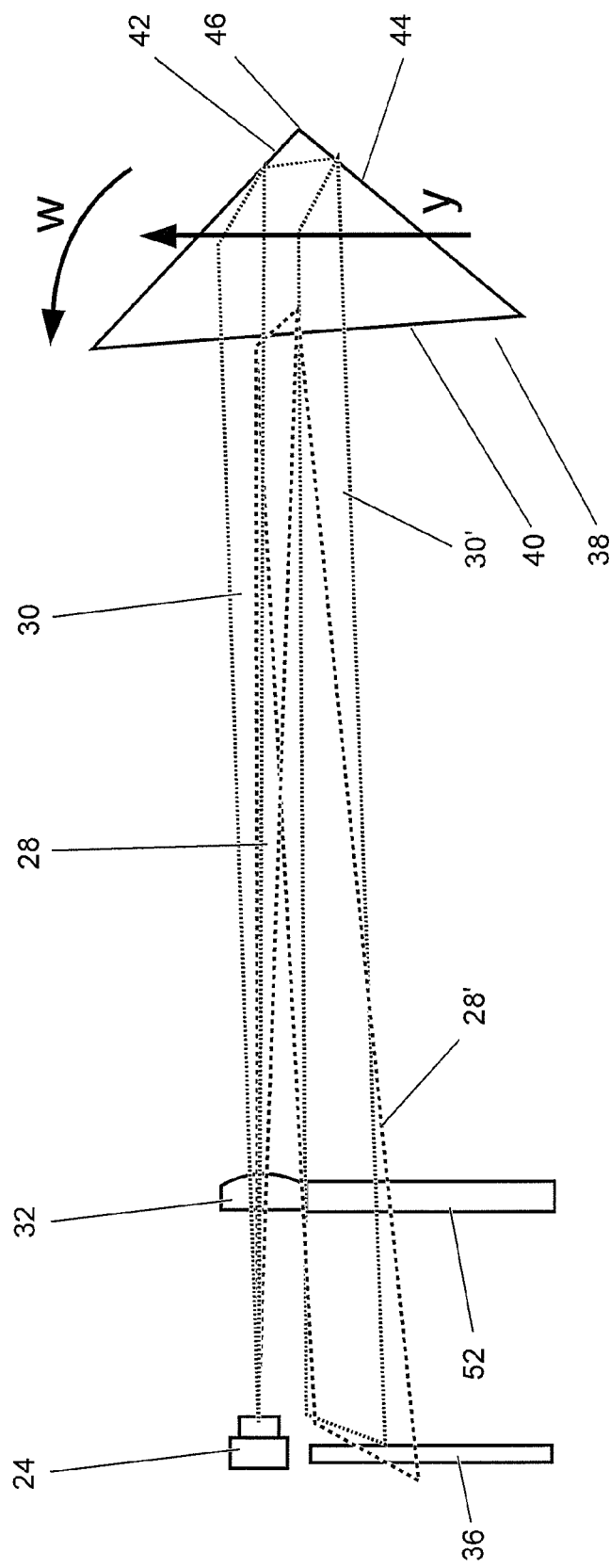
FIG. 6 shows a view, like those of FIGS. 4 and 5, of a further modified embodiment.

FIG. 6 shows a schematic of a modification of the system shown in FIGS. 1 to 3, where the light source 24 for the two fan-shaped light beams 28, 30 is located offset with respect to the detector 36 in the longitudinal direction of the detector 36 and there being no imaging optics for the detector 36, but instead a color filter window 52 is provided. The fan collimator 32 is likewise arranged offset in the longitudinal direction of the detector 36, i.e., in the radial direction with respect to the shafts 10, 12 and with respect to the color filter window 52.

Figure 4:
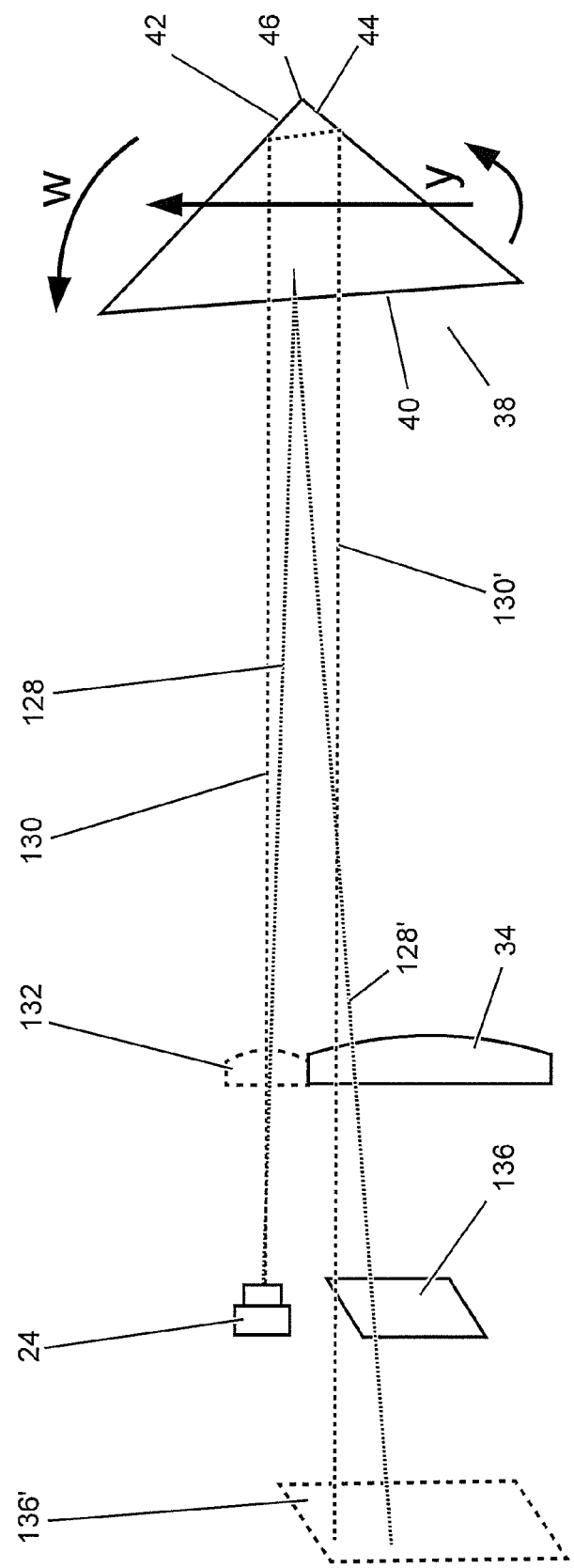
FIG. 4 is a schematic side view of another embodiment of a position determination device in accordance with the invention.
Figure 5:
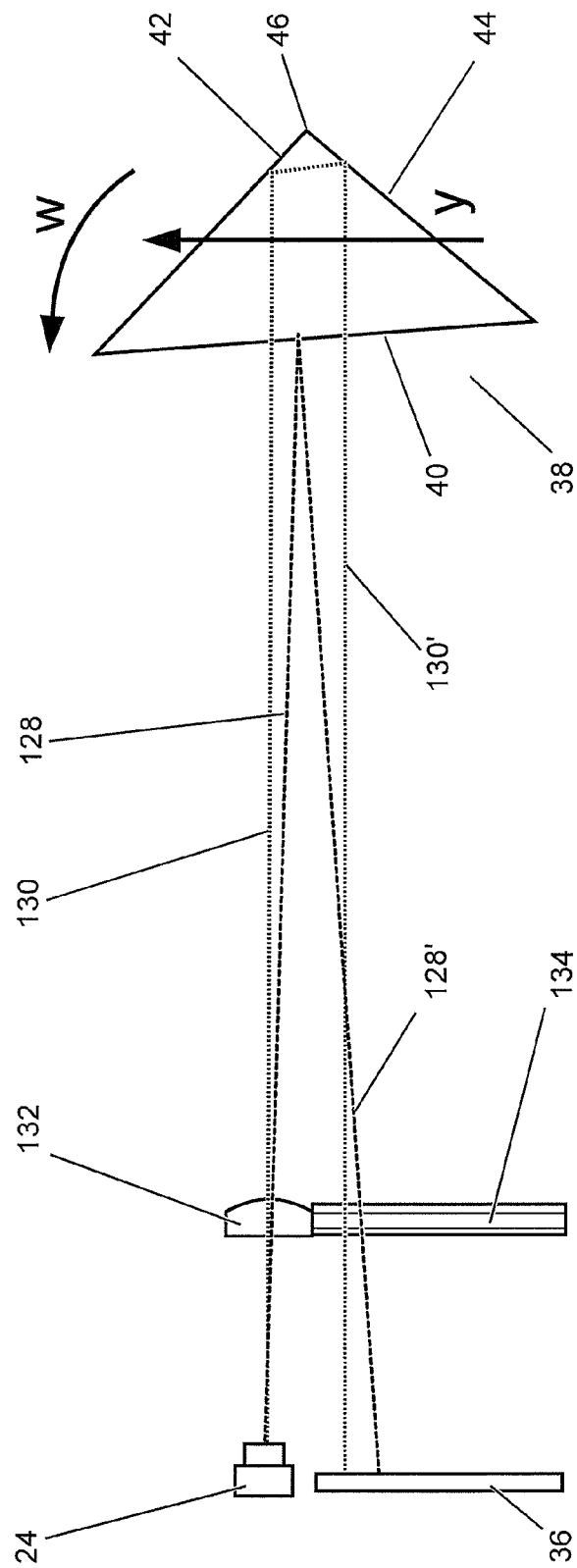
FIG. 5 shows a view, like that of FIG. 4, of a modified embodiment.

FIGS. 4 and 5 show two exemplary embodiments in which the light beams 128, 130 are not fan-shaped, but are cylindrical or conical; accordingly, the collimator 132 is not made as a fan collimator. The detector 136, in contrast to the previously described embodiments, is not made as a line-shaped detector, but as a surface detector, i.e., as a two-dimensional (and not as a one-dimensional) detector, the two coordinates of the point of incidence of the reflected light beams 128', 130' on the detector 136 being evaluated (and not only one coordinate, as in the previously described examples). Because a spherical lens 134, as imaging optics, is connected upstream of the surface detector 136, the widening of the measurement range which is indicated in conjunction with FIG. 1 and which is illustrated in FIG. 4, as suggested by a broken-line "virtual detector" 136' occurs.

FIG. 5 shows a modification of the embodiment from FIG. 4 where, as in FIG. 4, the first and the second light beams 128, 130 are not fanned. In contrast to the embodiment from FIG. 4, in the embodiment from FIG. 5, there is no spherical lens 34 as imaging optics, but instead a cylinder lens 134 is provided. Also, instead of having a surface detector 136, as in the embodiment from FIGS. 1 to 3, a line-shaped detector 36 is provided whose longitudinal direction is oriented perpendicular to the roof edge 46 and in the radial direction with respect to the shafts 10, 12. The cylinder lens 134 is arranged such that its focal line extends in the longitudinal direction of the line-shaped detector 36 (in the embodiment of FIG. 4, the detector 136 lies in the focal plane of the lens 34).

By using the cylinder lens 134 as imaging optics, the reflected beam 128', 130', regardless of the exact angle alignment of the reflector arrangement 38 around the y-axis, is always incident on the line-shaped detector 36 so that adjustability and calibration of the reflector arrangement 38 around the y-axis are omitted, —similar to the situation for the fanning of the first and second light beams 28, 30 in the embodiments according to FIGS. 1 to 3 and 6. In any case, in the embodiment from FIG. 5, as in the embodiments according to FIGS. 1-3 and 6, the lateral resolution in the measurement is omitted so that several rotational angle positions of the shafts 10, 12 must be measured to obtain all the information which is necessary for determining the misalignment of the shafts 10, 12.

The conventionally existing divergence of the two light beams 28, 30 and 128, 130 can be used to estimate the distance between the first measurement unit 14 and the second measurement unit 18 since a corresponding distance between the points of incidence of the reflected light beams 28', 30' and 128', 130" arises from this divergence.

The reflector arrangement 38 can also be made "hollow" instead of as a prism, side surfaces of the prism being functionally implemented by corresponding mirrors or mirror surfaces.

What is claimed is:

1. Apparatus for ascertaining the position of a first mechanical element and of a second mechanical element relative to one another, comprising:
    a first measurement unit having a first mounting device constructed to enable mounting of the first measurement unit on the first mechanical element, a light source which is able to generate spectrally different first and second light ray beams in substantially the same direction, and a position-sensitive optical detector,
    a second measurement unit having a second mounting device constructed to enable mounting of the second measurement unit on the second mechanical element, the second measurement unit having a reflector arrangement which faces the first measurement unit when the measurement units are mounted on the respective mechanical element in order to reflect the first and second light ray beams onto the optical detector, a surface of reflector arrangement facing the first measurement unit being configured as a color splitter that is able to reflect the first light ray beam to a greater extent than the second light ray beam and is able to transmit the second light ray beam to a greater extent than the first light ray beam, at least a rearward surface of the reflector arrangement being able to reflect the transmitted second light ray beam through the surface facing the first measurement unit,
    wherein the evaluation unit is configured to ascertain the position of the first and second mechanical elements relative to one another from positions of impingement of the reflected first and second light ray beams on the detector, and
    wherein said light source is a dual wave laser diode or two separate parallel laser diodes which are arranged next to one another.

2. The device in accordance with claim 1, wherein said light source comprises a dual wave laser diode.

3. The device in accordance with claim 2, further comprising a collimator for collimating the first and second light beams.

4. The device in accordance with claim 1, wherein said light source comprises two laser diodes which are located next relative to one another and are arranged parallel to each other.

5. The device in accordance with claim 1, wherein the light source is arranged so as to direct the light beams directly onto the reflector arrangement without the interposition of a reflecting element.

6. The device in accordance with claim 1, wherein the front surface of the reflector arrangement which is a color splitter comprises a cold light mirror.

7. The device in accordance with claim 1, wherein said at least one back surface comprises a first and a second back surface, the second back surface being located at an angle relative to the first back surface so as to reflect the transmitted second light beam from the first back surface to the second back surface and from the second back surface through the front surface to the first measurement unit.

8. The device in accordance with claim 1, wherein the first and the second back surface of the reflector arrangement are approximately perpendicular relative to each other.

9. The device in accordance with claim 1, wherein the reflector arrangement comprises a prism.

10. The device in accordance with claim 9, wherein the prism is a Porro prism or a triple prism.

11. The device in accordance with claim 10, wherein the plane of the fan shape of the first and second light beams directed toward the reflector arrangement is oriented essentially parallel to a roof edge or peak of the prism of the reflector arrangement.

12. The device in accordance with claim 1, wherein the light source is adapted to produce each of the first and second light beams in a fan shape, and wherein the detector is line-shaped.

13. The device in accordance with claim 12, wherein a incidence line of the fan shape of the reflected first and second light beams on the detector is essentially perpendicular to a longitudinal direction of the detector.

14. The device in accordance with claim 1, wherein the detector is color-sensitive to differentiate incidence of the reflected first light beam from incidence of the reflected second light beam on the detector.

15. The device in accordance with claim 1, wherein the light source comprises means for controlling the timing the intensity of the light beams such that the incidence of the first and second light beams on the detector can be distinguished by different time control of the intensity of the first light beam relative to second light beam.

16. The device in accordance with claim 1, wherein the first mechanical element is a first shaft and the second mechanical element is a second shaft, wherein the first mounting device is configured for attachment to a peripheral surface of the first shaft and wherein the second mounting device is configured for attachment to a peripheral surface of the second shaft.

17. The device in accordance with claim 16, wherein the means for producing the first and second light beams is adapted to produce each of the first and second light beams in a fan shape, wherein the detector is line-shaped, and wherein a plane of the fan shape of the first and of the second light beam is oriented essentially tangentially with respect to peripheral surfaces of the shafts.

18. The device in accordance with claim 16, wherein the detector is a strip or line detector and wherein a longitudinal direction of the detector is oriented essentially radially with respect to the peripheral surfaces of the shafts.

19. The device in accordance with claim 16, wherein the reflector arrangement comprises a Porro or roof edge prism and wherein a peak or roof edge of the prism is oriented essentially tangentially with respect to the peripheral surfaces of the shafts.

20. The device in accordance with claim 1, wherein imaging optics with a spherical or cylindrical lens is connected upstream of the detector to image the reflected first and second beams onto the detector.

21. The device in accordance with claim 20, wherein the imaging optics has a cylindrical lens with a focal line that runs essentially in a longitudinal direction of the detector.

22. The device in accordance with claim 1, wherein a color filter window is connected upstream of the detector.

23. The device in accordance with claim 1, wherein the means for producing the first and second light beams and the detector are arranged laterally offset relative to one another.

24. The device in accordance with claim 1, further comprising at least one collimator for collimating the first and second light beam and imaging optics, and wherein the imaging optics and the at least one collimator are arranged laterally offset relative to one another upstream of the detector.

\* \* \* \* \*